(12) United States Patent
Moon et al.

(10) Patent No.: US 11,187,891 B1
(45) Date of Patent: Nov. 30, 2021

(54) SPATIAL LIGHT MODULATOR USING PHASE-CHANGE MATERTALS WITH IMPROVED FILL FACTOR

(71) Applicant: HRL Laboratories, LLC, Malibu, CA (US)

(72) Inventors: Jeong-Sun Moon, Moorpark, CA (US); Hwa Chang Seo, Torrance, CA (US); Kyung-Ah Son, Moorpark, CA (US); Kangmu Lee, Malibu, CA (US)

(73) Assignee: HRL Laboratories, LLC, Malibu, CA (US)

( * ) Notice: Subject to any disclaimer, the term of this patent is extended or adjusted under 35 U.S.C. 154(b) by 606 days.

(21) Appl. No.: 15/949,913

(22) Filed: Apr. 10, 2018

Related U.S. Application Data

(60) Provisional application No. 62/518,434, filed on Jun. 12, 2017, provisional application No. 62/518,438, filed on Jun. 12, 2017.

(51) Int. Cl.
    *G02B 26/08* (2006.01)
    *G02B 27/09* (2006.01)
    *G02F 1/1335* (2006.01)

(52) U.S. Cl.
    CPC ..... *G02B 26/0833* (2013.01); *G02B 27/0977* (2013.01); *G02F 1/133553* (2013.01)

(58) Field of Classification Search
CPC .............. G02B 26/0833; G02B 26/001; G02B 26/0841; G02B 26/02; G02B 26/06; G02B 26/0816; G02B 26/00; G02B 26/005; G02B 27/0068; G02B 26/08; G02B 26/0825; G02B 2027/0178; G02B 26/0808; G02B 27/0172; G02B 27/0927; G02B 27/0977; G02B 27/42; G02B 3/14; G02B 1/005; G02B 2027/014; G03F 7/70116; G03F 7/70058; G03F 7/70291; G03F 7/70075; G03F 7/70108; G03F 7/70141; G03F 7/70158; G03F 7/70191; G03F 7/70566; G03F 7/7015; G03F 7/0007; G03F 7/20; G03F 7/40; G03F 7/70025; G03F 7/70066; G03F 7/70083; G03F 7/70091;

(Continued)

(56) References Cited

U.S. PATENT DOCUMENTS 4,596,992 A * 6/1986 Hornbeck ............ G02B 7/1827
    347/131
5,706,067 A * 1/1998 Colgan ............. G02F 1/133553
    349/114

(Continued)

FOREIGN PATENT DOCUMENTS

WO     2015/097468 A1    7/2015

OTHER PUBLICATIONS

EE Times, Nov. 2011, "Samsung preps 8-Gbit phase-change memory", pp. 1-2.

(Continued)

*Primary Examiner* — William R Alexander
*Assistant Examiner* — Sharrief I Broome
(74) *Attorney, Agent, or Firm* — Ladas & Parry

(57) ABSTRACT

A spatial light modulator includes a substrate, a phase change material cell on the substrate, the phase change material cell including an electrical heater on the substrate, an optical reflector layer on the electrical heater, and a phase change material layer on the optical reflector layer.

12 Claims, 7 Drawing Sheets

(58) Field of Classification Search

CPC .. G03F 7/70133; G03F 7/702; G03F 7/70216; G02F 1/0131; G02F 1/0128; G02F 2202/32; G02F 1/0072; G02F 1/21; G02F 1/29; G02F 1/0018; G02F 1/0147; G02F 1/03; G02F 1/092; G02F 1/009; G02F 1/0121; G02F 1/0123; G02F 1/076; G02F 1/1313; G02F 1/13306; G02F 1/133526; G02F 1/15165; G02F 1/155; G02F 1/19; G09G 3/3466; G09G 3/346; G09G 3/2003; G09G 3/3433; G09G 5/003; G09G 2300/0426; G09G 2300/0473; G09G 2300/0842; G09G 2300/0465; G09G 2300/0838; G09G 2300/0857; G09G 2300/0866; G09G 2300/0876; G09G 2310/0235; G09G 2310/0237; G09G 2310/0272; G09G 2310/063; G09G 2320/0242; G09G 2340/0492; G09G 2360/144; H01L 2924/00; H01L 2224/48091; H01L 2924/0002; H01L 2924/1461; H01L 27/3232; H01L 2924/00014; H01L 2224/48227; H01L 2251/308; H01L 2251/5323; H01L 2251/5338; H01L 23/38; H01L 27/1214; H01L 27/124; H01L 27/1248; H01L 27/1259; H01L 27/32; H01L 27/3225; H01L 27/3241; H01L 27/3244; H01L 27/326

See application file for complete search history.

(56) References Cited

U.S. PATENT DOCUMENTS

| 6,819,469 | B1* | 11/2004 | Koba | G03H 1/2294 359/290 |
|---|---|---|---|---|
| 7,053,519 | B2* | 5/2006 | Sinclair | B81B 3/0054 310/308 |
| 8,115,991 | B2 | 2/2012 | Wild et al. | |
| 8,655,189 | B2 | 2/2014 | Almassy et al. | |
| 8,717,659 | B2 | 5/2014 | Zheludev et al. | |
| 8,900,930 | B2 | 12/2014 | Moon | |
| 9,293,197 | B2 | 3/2016 | Baleine et al. | |
| 9,293,699 | B1 | 3/2016 | Moon | |
| 9,368,720 | B1 | 6/2016 | Moon et al. | |
| 9,470,955 | B2 | 10/2016 | Pernice et al. | |
| 2008/0304140 | A1 | 12/2008 | Wild et al. | |
| 2009/0257113 | A1* | 10/2009 | Smith | G02B 26/001 359/321 |
| 2010/0225989 | A1* | 9/2010 | Anders | G02F 1/19 359/288 |
| 2014/0191181 | A1* | 7/2014 | Moon | H01L 27/2409 257/4 |
| 2015/0098032 | A1* | 4/2015 | Park | G02F 1/009 349/21 |
| 2018/0356657 | A1* | 12/2018 | Xu | G02F 1/157 |

OTHER PUBLICATIONS

Perniola et al., "Electrical behavior of phase change memory cells based on GeTe", IEEE EDL., vol. 31, p. 488, (2010).

Chua et al., "Low resistance, high dynamic range reconfigurable phase change switch for RF applications", Applied Physics Letters vol. 97, 183506, (2010).

Lo et al., "Three-terminal probe reconfigurable phase-change material switches", IEEE Transactions on Electron Devices., vol. 57, p. 312, (2010).

Wen et al., "A phase-change via-reconfigurable on-chip inductor", IEDM Tech digest, (2010).

J. Moon et al., "Development toward high-power sub-1ohm DC-67 GHz RF switches using phase-change materials for reconfigurable RF front-end", IEEE International Microwave Symposium (IMS), pp. 1-3, Jun. 2014.

J. Moon et al., "11 THz figure-of-merit phase-change RF switches for reconfigurable wireless front-ends", IEEE International Microwave Symposium (IMS), pp. 1-4, Jun. 2015.

* cited by examiner

SPATIAL LIGHT MODULATOR USING PHASE-CHANGE MATERIALS WITH IMPROVED FILL FACTOR

CROSS REFERENCE TO RELATED APPLICATIONS

This application relates to and claims the benefit of priority from U.S. Provisional Patent Application 62/518,434, filed Jun. 12, 2017, and U.S. Provisional Patent Application 62/518,438, filed Jun. 12, 2017, which are incorporated herein by reference as though set forth in full.

STATEMENT REGARDING FEDERAL FUNDING

This invention was made under U.S. Government contract W911NF-16-C-0007 awarded by the U.S. Army/DARPA. The U.S. Government has certain rights in this invention.

TECHNICAL FIELD

This disclosure relates to electrically switchable mirrors and phase change material (PCM).

BACKGROUND

Infrared imaging and spectral sensing are critically important for many applications, including those that have visually degraded conditions. A spatial light modulator (SLM) is a device to modulate the amplitude, phase, or polarization of light waves in space to steer the light waves. Hence, SLMs are used for various applications including imaging, projection display, laser beam shaping, and optical tweezers. In the prior art, SLMs are made of either MEMS micro-mirror array or liquid crystal on silicon (LCoS), as shown in FIGS. 1A and 1B, respectively. The LCoS-based SLMs operate in the range below 1.6 um wavelength. The MEMS-based SLMs work for all-wavelengths. But due to the mechanical movement of the MEMS, an angle of deflection is limited to ±12 degree with a limited switching speed below kHz. So far, there are no clear approaches to make SLMs operating in infrared wavelength range without mechanical movement that have a wide field-of-view.

A chalcogenide is a compound containing selenium (Se), Tellurium (Te), or Sulfur (S). Chalcogenide-based phase-change materials have been used in re-writable optical DVDs, which use a laser light to write or erase the information. Recently, phase-change materials (PCM) have been investigated for RF switch applications. A unique feature of a PCM is a large change in refractive index between a crystalline state and an amorphous state in the infrared wavelength range. Also, the optical absorption characteristics change between the crystalline state and the amorphous state in the infrared wavelength range. The present invention utilizes the change in the optical absorption associated with the phase of the PCM.

The principal of phase-change materials (PCM) has been known since the 1960s; their application in rewritable optical DVDs has been developed using $Ge_2Sb_2Te_5$ or $(Ag,In)Sb_2Te$. Lately, PCMs have been developed for non-volatile memory as a future replacement for flash memory in the IC industry by companies such as Micron, Samsung, IBM, STMicroelectronics, and Intel.

The following references relate to digital PCMs and are incorporated herein by reference.

1. EE Times, November, 2011, "Samsung preps 8-Gbit phase-change memory"
2. Perniola et al", "Electrical behavior of phase change memory cells based on GeTe", IEEE EDL., vol. 31, p. 488, (2010).

The following references relate to phase-change materials for RF switch applications and are incorporated herein by reference.

3. Moon, J-S, "Method to make RF-PCM switches and circuits with phase-change materials" U.S. Pat. No. 8,900,930, issued Dec. 2, 2014, and U.S. Pat. No. 9,293,699, issued Mar. 22, 2016.
4. Moon, J-S, "Methods to make phase-change material RF switches with thermal dielectrics", U.S. Pat. No. 9,368,720, issued Jun. 14, 2016.
5. Chua et al., "Low resistance, high dynamic range reconfigurable phase change switch for RF applications", Applied Physics Letters vol. 97, 183506, (2010): While the article mentioned about PCM material for RF switches, there are no RF switch design shown.
6. Lo et al., "Three-terminal probe reconfigurable phase-change material switches", IEEE Transactions on Electron Devices., vol. 57, p. 312, (2010): The switch is in three-terminal layout, consisting of an array of sub-vias. The switching was done by external probes.
7. Wen et al., "A phase-change via-reconfigurable on-chip inductor", IEDM Tech digest, (2010): Demonstrated via structures with GeTe material, where Ron is 1.1 ohm with Ron/Roff of $3\times10^4$. The switching was done by external probes.
8. J. Moon et al., "Development toward high-power sub-1 ohm DC-67 GHz RF switches using phase-change materials for reconfigurable RF front-end", IEEE International Microwave Symposium (IMS), pp. 1-3, June 2014.
9. J. Moon et al., "11 THz figure-of-merit phase-change RF switches for reconfigurable wireless front-ends", IEEE International Microwave Symposium (IMS), pp. 1-4, June 2015.

Other references considered relevant are listed below and are incorporated herein by reference.

10. U.S. Pat. No. 9,470,955 B2, issued Oct. 18, 2016, Nanophotonic spatial light modulators. This patent utilizes phase change materials embedded in a waveguide and trigger the phase change by sending laser pulses through the waveguide.
11. U.S. Pat. No. 8,655,189 B2, issued Feb. 18, 2014 Optical modulation utilizing structures including metamaterials. This patent utilizes a metamaterial structure configured to receive and process an input optical signal at one wavelength by applying stimulus to oxide-based phase-change materials such as VO2 and Ti2O3.
12. U.S. Pat. No. 8,717,659 B2, issued May 6, 2014 Tunable metamaterials and related devices. This patent discloses a tunable metamaterials comprising of a membrane on which is arranged a two-dimensional array of elements, and the tuning is done by mechanically moving a subarray vertically.
13. U.S. Pat. No. 6,819,469 B1, issued Nov. 16, 2014 "High-resolution spatial light modulator for 3-dimensional holographic display" which uses phase-change materials to achieve spatial light modulation for a specific application (holographic display).
14. U.S. Pat. No. 8,115,991 B2, issued Feb. 14, 2012 & US20080304140 A1, filed Dec. 11, 2008 "Switchable infrared filter" which includes a switchable infrared filter wherein the intermediate layer contains a thermochromic material of vanadium oxide with 68 degree C. for a semiconductor to metal transition. This requires a constant standby power dissipation.

15. U.S. Pat. No. 9,293,197 B2, issued Mar. 22, 2016 "Reconfigurable phase change material masks for electro-optical compressive sensing" describes a pixel-level reconfigurable infrared optical mask for photo-detector, i.e. a spatial light modulator for a specific application, using $Ge_2Sb_2Te_5$ phase-change materials as the switching layer and dielectric layer containing $ZnS$—$SiO_2$. The PCM devices are vertically arranged memory cells.

The following references relate to phase-change material display devices which utilize GeSbTe memory alloy for a visible display and are incorporated herein by reference.

16. US Patent, US2015/0098032 A1, filed Mar. 12, 2014 "Phase change material display device"
17. WO2015097468 A1, published Jul. 2, 2015 "Display device based on phase-change materials"

What is needed is an improved spatial light modulator that operates in the infrared wavelength range with a wide field of view, large infrared contrast, enhanced fill factors, and no standby power dissipation. The embodiments of the present disclosure answer these and other needs.

SUMMARY

In a first embodiment disclosed herein, a spatial light modulator comprises a substrate, and a phase change material cell on the substrate, the phase change material cell comprising an electrical heater on the substrate, an optical reflector layer on the electrical heater, and a phase change material layer on the optical reflector layer.

In another embodiment disclosed herein, a method of providing a spatial light modulator comprises providing a substrate, and providing a phase change material cell on the substrate, the phase change material cell comprising an electrical heater on the substrate, an optical reflector layer on the electrical heater, and a phase change material layer on the optical reflector layer, wherein when the phase change material layer is in an amorphous phase, light may be transmitted through the phase change material layer, and wherein when the phase change material layer is in a crystalline phase, light is absorbed and not transmitted through the phase change material layer These and other features and advantages will become further apparent from the detailed description and accompanying figures that follow. In the figures and description, numerals indicate the various features, like numerals referring to like features throughout both the drawings and the description.

DETAILED DESCRIPTION

In the following description, numerous specific details are set forth to clearly describe various specific embodiments disclosed herein. One skilled in the art, however, will understand that the presently claimed invention may be practiced without all of the specific details discussed below. In other instances, well known features have not been described so as not to obscure the invention.

The present disclosure describes an electrically switchable light modulator, which has an array of phase change materials (PCM), which may be SbTe-based alloys. The electrically switchable mirror consists of PCM on top of an optical reflector and a metal heater plate. Depending on the material phase (crystalline or amorphous), infrared light can be reflected or absorbed by the PCM. The phase of the PCM is controlled electrically by a voltage pulse applied to the heater plate, which may include a single layer of metal film or multiple layers of metal films. The disclosed PCM-based electrically switchable light modulators can also be used as a spatial light modulator (SLM).

The PCM is phase-change SbTe alloy, rather than the common memory material GeSbTe, which can be deposited directly onto SiO2/Si wafers at room temperature by sputtering on a large wafer-scale and can be transformed into a (poly)crystalline state below 135° C. via structural phase-transition. With Ge doping, the crystallization temperature can be increased to 200° C., as shown by arrow 10 in FIG. 2A.

Figure 1B:
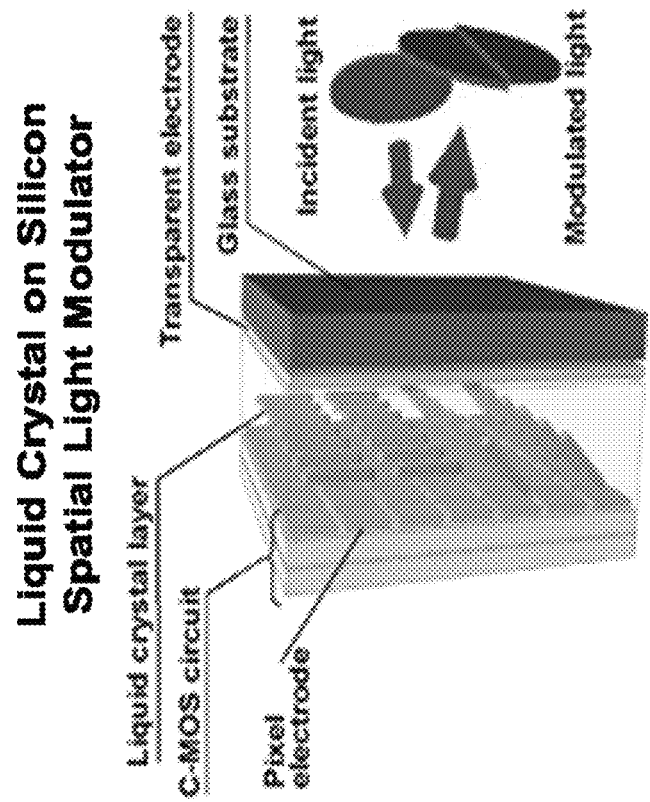
FIG. 1B shows liquid crystal on silicon, modulating phase or amplitude of optical beams to control the reflected light, for an electrically-addressed spatial light modulator in accordance with the prior art.
Figure 1A:
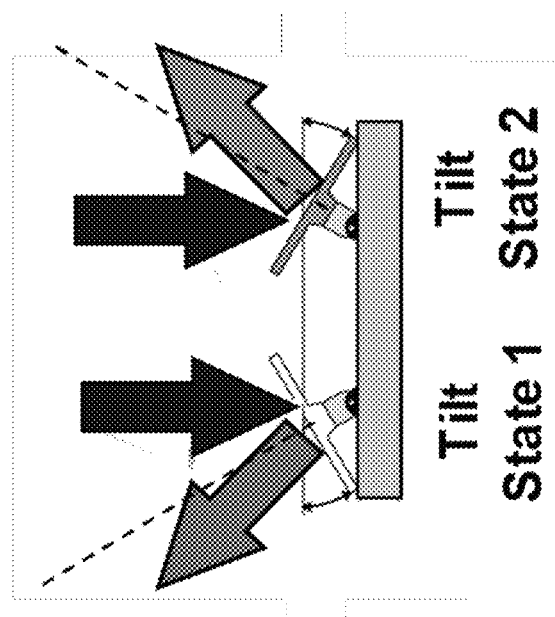
FIG. 1A shows a MEMS micro-mirror array, steering optical beam paths, for an electrically-addressed spatial light modulator in accordance with the prior art.
Figures 2A, 2B:
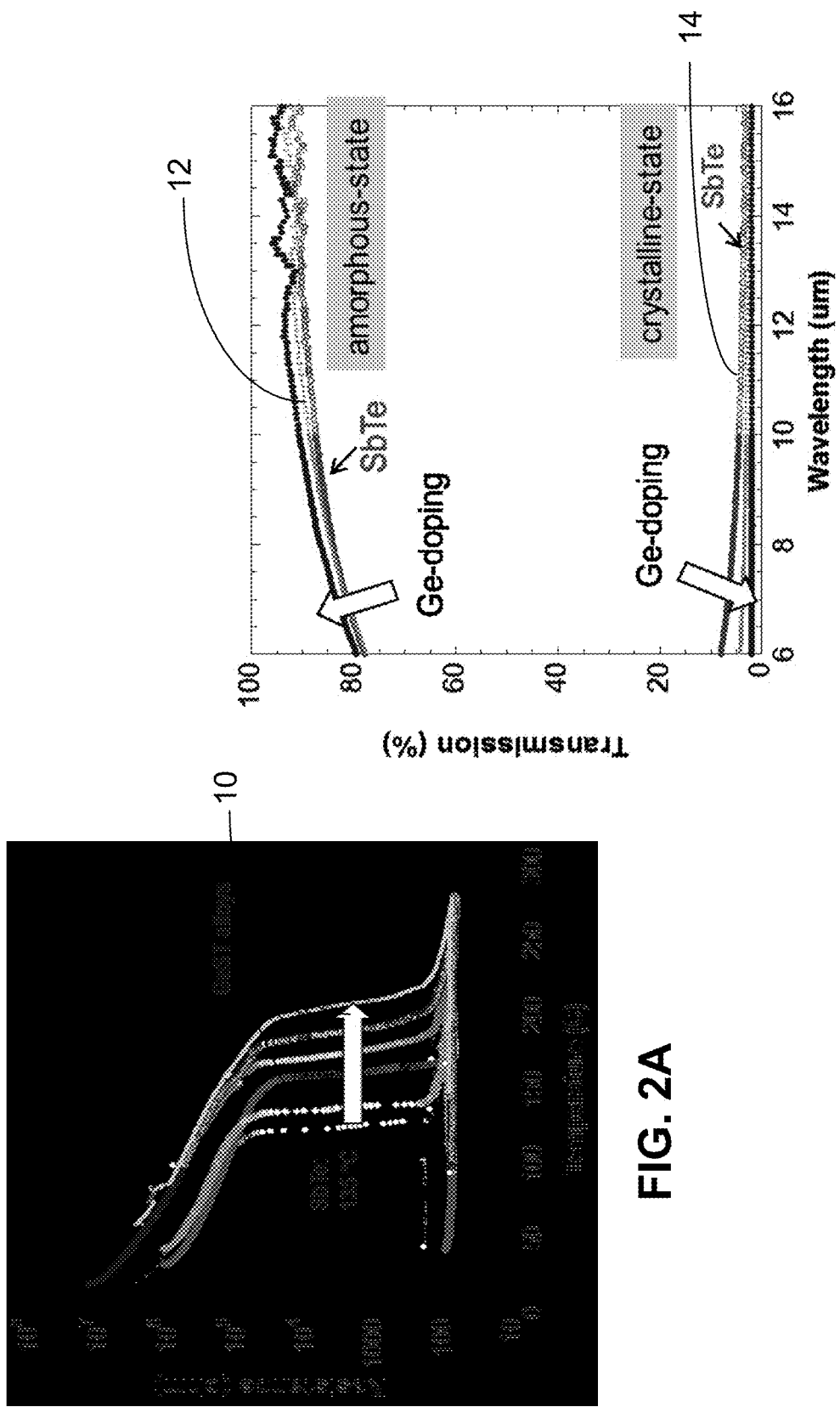
FIG. 2A shows measured resistance versus temperature of SbTe-based alloys with Ge doping in accordance with the present disclosure.
FIG. 2B shows a measured optical property change associated with amorphous-SbTe and crystalline-SbTe with Ge doping in accordance with the present disclosure.

As explained further below, reversible phase changes may be made between an amorphous phase and a crystalline phase by changing the PCM temperature with a heater. FIG. 2B shows that depending on whether the PCM is in an amorphous phase or a crystalline phase, the PCM is in either a high percent infrared transmission state 12 or in an absorber state 14, respectively. There is a high contrast between the two states.

Figure 3:
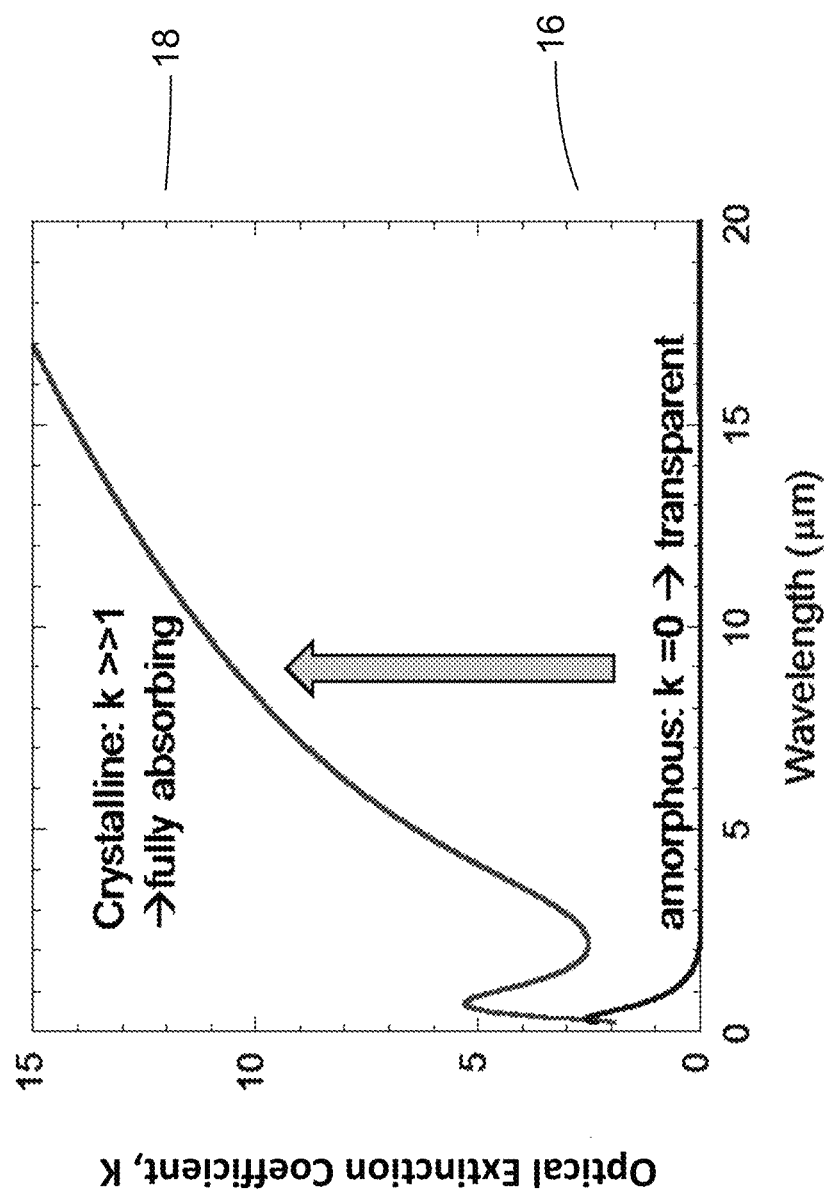
FIG. 3 shows a measured refractive index of SbTe-based phase change materials, showing a dramatic change in the refractive index depending on its phase, in accordance with the present disclosure.

FIG. 3 shows the measured refractive index or optical extinction coefficient k by ellipsometry of SbTe-based PCMs up to a 16 μm wavelength, and shows a dramatic change in the refractive index (k) depending on whether the PCM is in an amorphous phase or a crystalline phase. The optical extinction coefficient k is essentially k=0 for the amorphous phase 16, and the PCM in the amorphous phase 16 is substantially transparent to infrared wavelengths. The optical extinction coefficient k is much greater than 1 for the crystalline phase 18, so the PCM in the crystalline phase 18 is substantially opaque and absorbs infrared wavelengths. Therefore, infrared light can be reflected from or absorbed in the PCM-based IR modulator cells depending on their phase, which can provide infrared (IR) modulation with high contrast between the PCM-based IR modulator cells. When the phase change material layer is in an amorphous phase, the optical extinction coefficient is substantially zero for wavelengths ranging from 1 to 17 micrometers. When the phase change material layer is in a crystalline phase, the optical extinction coefficient is substantially greater than one for wavelengths ranging from 1 to 17 micrometers.

Figure 4A:
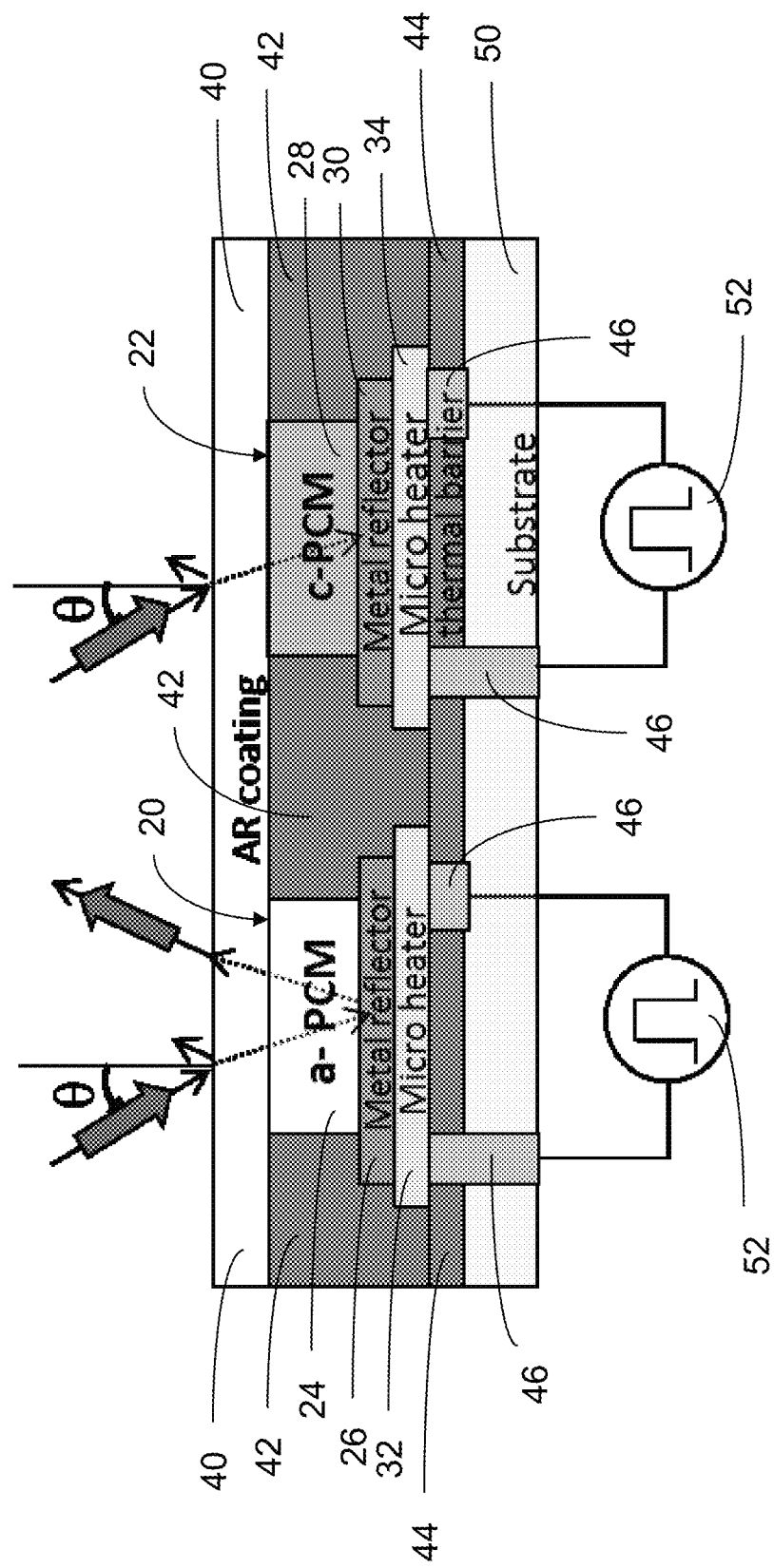
FIG. 4A shows a phase change SbTe-based electrically-switchable infrared mirror or modulator operating in LWIR range in accordance with the present disclosure.

FIG. 4A shows a schematic drawing of a SbTe-based programmable infrared modulator that may be used for Long Wavelength Infrared (LWIR). The modulator shows two PCM cells 20 and 22. PCM cell 20 is shown as being in an amorphous phase that allows transmission of the infrared wavelengths through the PCM 24 to the metal reflector 26. PCM cell 22 is shown as being in a crystalline phase, so that PCM 28 absorbs infrared wavelengths so that infrared wavelengths are not reflected from the metal reflector 30.

FIG. 4A is only an example of a programmable infrared modulator, and it should be understood that the modulator may have many cells that may be arranged in an array with some or all of the PCM cells in an amorphous phase and some or all of the PCM cells in an crystalline phase.

The SbTe-based programmable infrared modulator can achieve close to full-on (~90% optical reflection) for the PCM cells in an amorphous phase and full-off (0% optical reflection) for the PCM cells in the crystalline phase. The optical contrast can be greater than 100:1.

Each PCM mirror cell, such as PCM cells 20 or 22, has a layer 24 or 28, respectively, of phase-change chalcogenide such as SbTe or doped-SbTe containing alloys, a metallic layer 26 or 30, respectively, to form an optical reflector, and a heater 32 or 34, respectively, which may be a TiW heater. The phase-change SbTe containing alloy may be covered with an anti-reflection coating 40. The phase-change SbTe containing alloy layer 24 or 28 may be deposited at room temperature by sputtering.

An absorber layer 42 of a material that absorbs light including infrared wavelengths is preferably located in gaps between the PCM mirror cells 20 and 22.

The PCM mirror cells 20 and 22 may be on a substrate 50, which may be silicon, and may be isolated by a dielectric 44, such as $SiO_2$, from the substrate 50. The dielectric layer 44 may act as a thermal barrier between the PCM mirror cells 20 and 22 and the substrate 50 to mitigate heat spreading from one PCM mirror cell to another PCM mirror cell, such as between PCM cell 20 and PCM cell 22.

As shown in FIG. 4A the heaters 32 and 34 may be micro heaters and are electric. The heaters 32 and 34 are connected to electrodes 46 that extend through the substrate 50. Control electronics 52, which may be CMOS, for the heaters 32 and 34 may be integrated on the backside of the substrate 50.

Figure 4B:
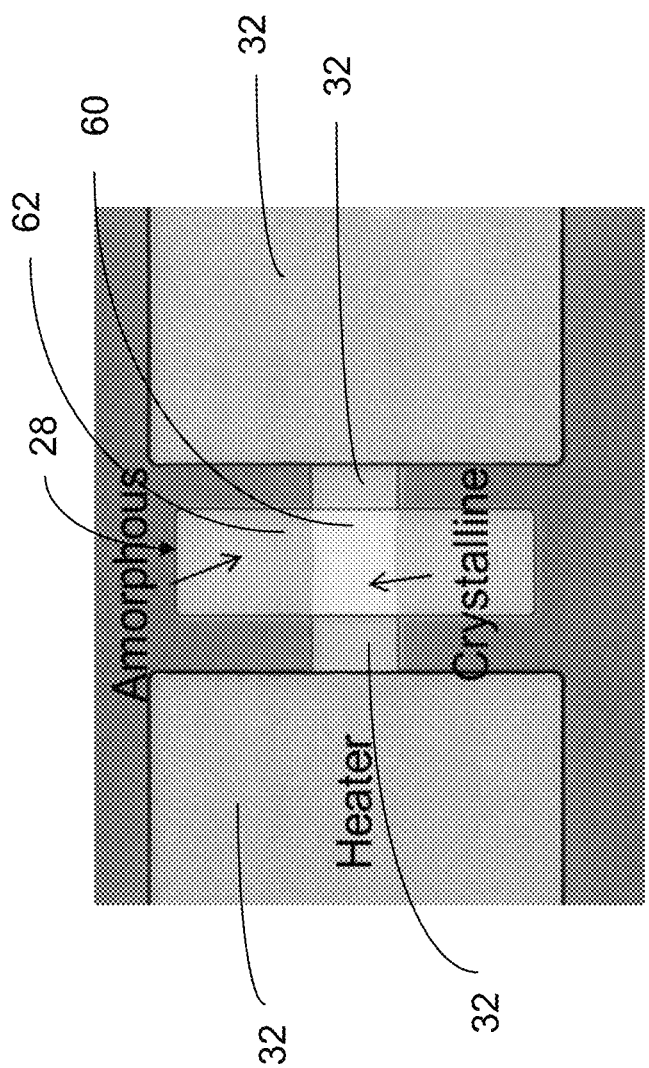
FIG. 4B shows an optical image of a SbTe-containing PCM mirror after switching by an electrical pulse applied to a heater, showing an optical contrast in accordance with the present disclosure.

FIG. 4B shows an optical image of SbTe containing PCM 28 after switching it from an amorphous state to a crystalline state by applying an electrical pulse to a TiW heater beneath the PCM 28. The SbTe containing PCM area 60 switched to crystalline phase shows a high optical contrast to the PCM area 62 in the amorphous phase.

An IR modulator device with phase-change SbTe-based electrically-switchable PCM mirrors, as described above, can be fabricated with an array of PCM cells on silicon wafers for forming a tunable and reconfigurable infrared modulator, and a spatial light modulator.

Figure 5A:
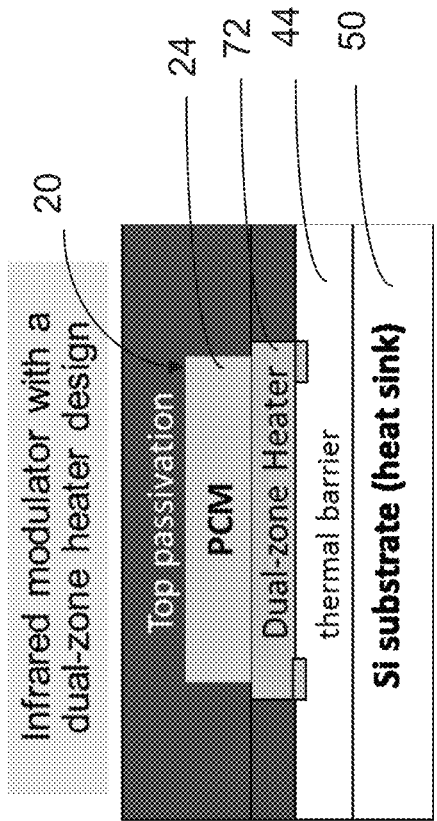
FIG. 5A shows a phase change SbTe-based electrically-switchable infrared mirror with a single heater design in accordance with the present disclosure.
Figure 5B:
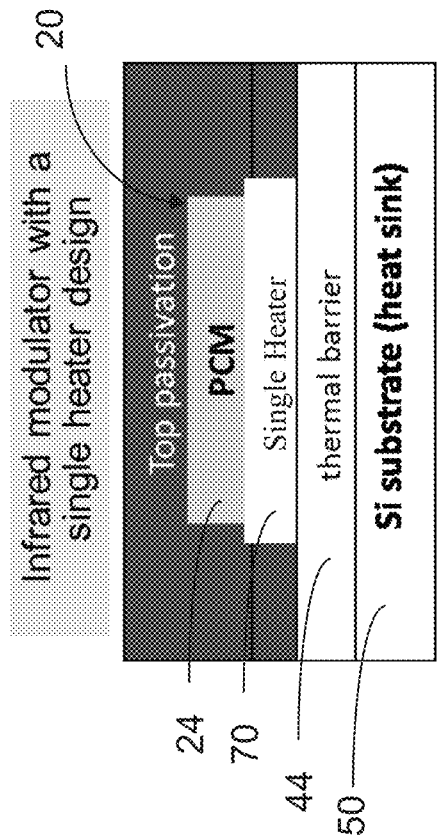
FIG. 5B shows a phase change SbTe-based electrically-switchable infrared mirror with a dual zone heater design in accordance with the present disclosure.
Figure 5C:
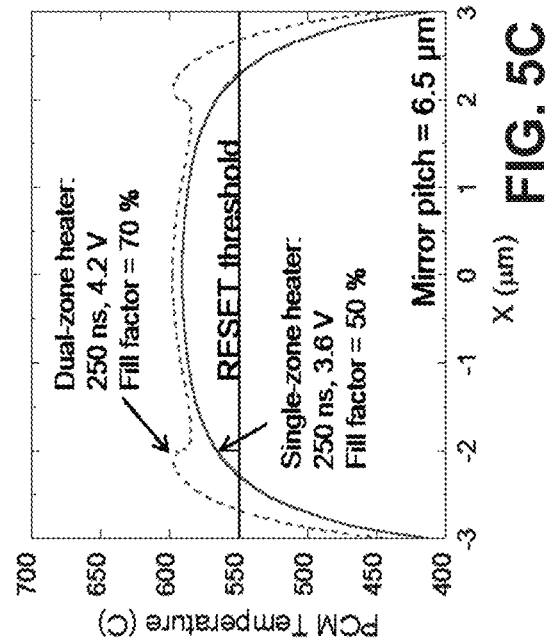
FIG. 5C shows a comparison of dual zone and single heater designs showing that the dual-zone heater design improves the channel temperature uniformity and effective fill-factor in accordance with the present disclosure.

FIG. 5A shows a PCM mirror cell 20 with a single heater plate 70, and FIG. 5B shows a PCM mirror cell 20 with a dual-zone heater 72. The dual-zone heater 72 design improves the lateral temperature uniformity by compensating cooling at the edges of the PCM mirror cell 20 with additional heating at the edges. As shown in FIG. 5C, a COMSOL thermal model shows that the dual-zone heater 72 design improves the lateral temperature uniformity over the single heater 70 design. In addition, the dual-zone heater 72 design increases an effective fill factor to 70% compared to only 50% for the single-zone heater 70 design. As shown in FIG. 5C, for the simulation the single zone and the dual zone heaters were each pulsed with a 250 ns electrical pulse, and a PCM mirror pitch of 6.5 μm was used for the fill factor estimation.

Figures 6A, 6B:
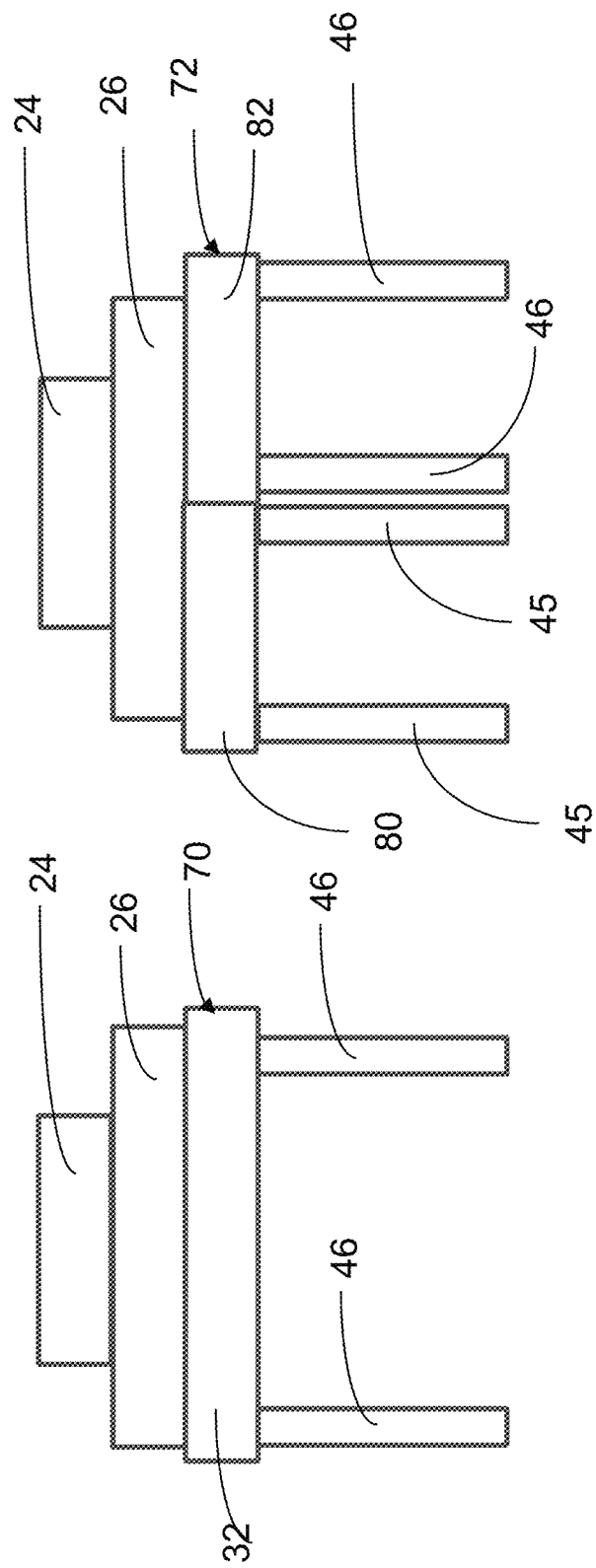
FIG. 6A shows a single zone heater design in accordance with the present disclosure.
FIG. 6B shows a dual zone heater design in accordance with the present disclosure.

As shown in FIG. 6A, the single zone heater design 70 consists of one electrical heater 32 under the reflective metallic layer 26, which is under the PCM layer 24. The one electrical heater 32 is activated by an electrical pulse on the set of electrodes 46. The electrical heater 32 may be TiW.

A dual zone heater design 72 is shown in FIG. 6B. As shown in FIG. 6B the dual zone heater design 72 has two electrical heaters 80 and 82 under the reflective metallic layer 26, which is under the PCM layer 24. The two electrical heaters 80 and 82 may be arranged side by side, as shown in FIG. 6B; however, they may be arranged in other configurations. Electrical heater 80 is activated by an electrical pulse on the set of electrodes 45, and the electrical heater 82 is activated by an electrical pulse on the set of electrodes 46. The electrical pulses on the set of electrodes 45 may be different than the electrical pulses on the set of electrodes 46, and each can be adjusted by a controller 52 to provide lateral temperature uniformity across the PCM 24. Each of the electrical heaters 80 and 82 may be TiW.

Having now described the invention in accordance with the requirements of the patent statutes, those skilled in this art will understand how to make changes and modifications to the present invention to meet their specific requirements or conditions. Such changes and modifications may be made without departing from the scope and spirit of the invention as disclosed herein.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "comprising the step(s) of . . . ."

What is claimed is:

1. A spatial light modulator comprising:
   a substrate;
   a first phase change material cell on the substrate, the first phase change material cell comprising:
      a first electrical heater on the substrate;
      a first optical reflector layer on the first electrical heater; and
      a first phase change material layer on the first optical reflector layer, wherein the first phase change material layer comprises an SbTe alloy;
      wherein the first phase change material layer is substantially transparent to infrared wavelengths in an amorphous phase and is substantially opaque to infrared wavelengths in a crystalline phase; and
   at least a second phase change material cell on the substrate, the second phase change material cell comprising:
      a second electrical heater on the substrate;
      a second optical reflector layer on the second electrical heater; and
      a second phase change material layer on the second optical reflector layer, wherein the second phase change material layer comprises an SbTe alloy;
      wherein the second phase change material layer is substantially transparent to infrared wavelengths in an amorphous phase and is substantially opaque to infrared wavelengths in a crystalline phase; and
   a light absorber layer between the first phase change material cell and the second phase change material cell.

2. The spatial light modulator of claim 1 wherein the first phase change material layer and the second phase change material layer comprise a Ge or an In doped SbTe alloy.

3. The spatial light modulator of claim 2 wherein the first and the second phase change material layers are deposited at room temperature by sputtering.

4. The spatial light modulator of claim 1 further comprising:
   an anti-reflection coating on the first and the second phase change material layer.

5. The spatial light modulator of claim 1 further comprising:
   a thermal barrier between the first and the second electrical heater and the substrate.

6. The spatial light modulator of claim 5 wherein the thermal barrier comprises a dielectric or $SiO_2$.

7. The spatial light modulator of claim 1 wherein the first and the second optical reflector layers are metallic.

8. The spatial light modulator of claim 1 wherein the first and the second electrical heaters comprise TiW.

9. The spatial light modulator of claim 1:
   wherein when the first phase change material layer is in an amorphous phase, light may be transmitted through the first phase change material layer; and
   wherein when the first phase change material layer is in a crystalline phase, light is absorbed and not transmitted through the first phase change material layer.

10. The spatial light modulator of claim 1:
    wherein when the first phase change material or the second phase change material layer is in an amorphous phase, an optical extinction coefficient is substantially zero for wavelengths ranging from 1 to 17 micrometers; and
    wherein when the first phase change material or the second phase change material layer is in a crystalline phase, the optical extinction coefficient is substantially greater than one for wavelengths ranging from 1 to 17 micrometers.

11. The spatial light modulator of claim 1 wherein the first electrical heater or the second electrical heater comprises:
    a single zone heater comprising:
       a first electrode and a second electrode coupled to the electrical heater; and
       a heater controller coupled to the first electrode and the second electrode.

12. The spatial light modulator of claim 1 wherein the first electrical heater or the second electrical heater comprises:
    a dual zone heater comprising:
       a first electrode and a second electrode coupled to the electrical heater;
       a second electrical heater;
       a third electrode and a fourth electrode coupled to the second electrical heater; and
       a heater controller coupled to the first, second, third and fourth electrode.

* * * * *